T. SPENCER.
STORAGE BATTERY.
APPLICATION FILED SEPT. 30, 1916.
1,303,513.
Patented May 13, 1919.
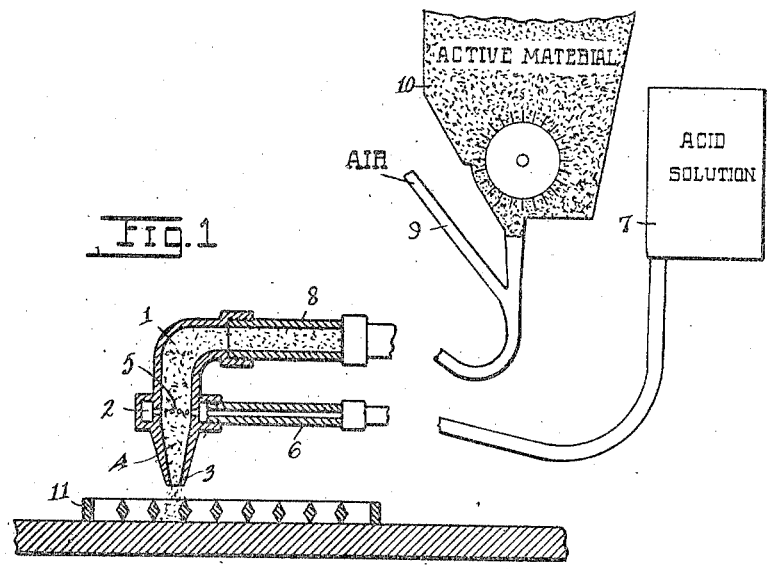
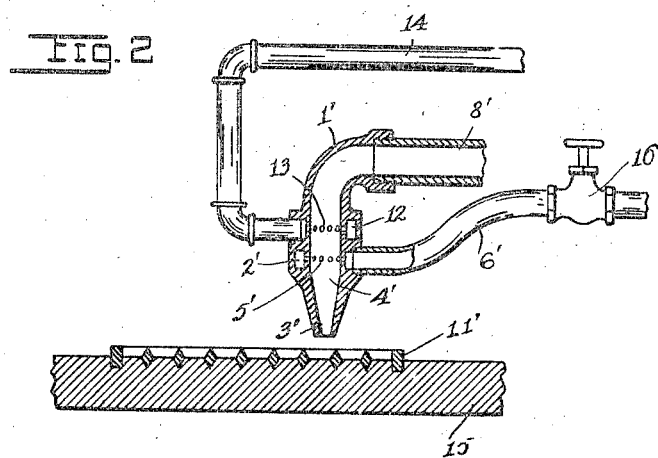
INVENTOR.
THOMAS SPENCER
BY
Ira J. Adams
ATTORNEY

UNITED STATES PATENT OFFICE.

THOMAS SPENCER, OF PHILADELPHIA, PENNSYLVANIA, ASSIGNOR, BY MESNE ASSIGNMENTS, TO NATIONAL CARBON COMPANY, INC., A CORPORATION OF NEW YORK.

STORAGE BATTERY.

1,303,513.  Specification of Letters Patent.  Patented May 13, 1919.

Application filed September 30, 1916. Serial No. 122,996.

*To all whom it may concern:*

Be it known that I, THOMAS SPENCER, a citizen of the United States, residing at Philadelphia, in the county of Philadelphia and State of Pennsylvania, have invented a certain new and useful Improvement in Storage Batteries, of which the following is a full, clear, and exact description.

This invention relates to storage batteries and more particularly to a method of applying the active paste to the grids or electrode framework.

In the construction of a storage battery plate of the kind which is known as the Faure or pasted type the active material is formed from a paste consisting of lead oxids which has enough lead sulfate to act as a binder. The usual way to produce this sulfate is to mix a certain amount of dilute sulfuric acid or a sulfate with the oxid and work it up into a paste and then apply it to the grid with suitable tools. The great objection to this method is that as soon as the acid comes in contact with the oxid it begins to form sulfate at once and any mixing after this, tends in a measure to break up the crystals of sulfate formed, with the result that the mass loses in a great amount its cohesive structure. To overcome this difficulty is the object of my invention. I accomplished this by adding the dilute acid or soluble sulfate to the lead oxids only at the instant they are applied to the grid so that the structure of the paste is not disturbed after the sulfate is once formed. I accomplished this in the way set forth in the following specification.

Figure 1 is a partial sectional view of apparatus for carrying out the method.

Fig. 2 is a modification adapted to paste a grid with varying acid content.

Referring to Fig. 1, the pasting device consists of a specially constructed spraying apparatus 1 having an annular chamber 2 and a nozzle 3. The annular chamber communicates with the main opening 4 through a number of perforations 5. The chamber 2 is also connected with the pipe 6 which is connected with some source 7 of dilute acid solution, which is delivered under a small amount of pressure. To the upper part of the sprayer 1 is connected a pipe 8 which is connected to a source 9 of compressed air into which is distributed in a uniform manner the lead oxids in dry state from some source 10. As this mixture of air and oxids pass the perforations 5, they meet the acid and mix with it, and at the same time the combination is forcibly driven out of the nozzle 3 into the storage battery grid 11 where the material builds up until the grid is filled. It will be seen that by this method the oxids will take the first set in the grid and will not be disturbed afterward.

It is known that the porosity of a plate can be varied by the strength of the acid used, generally the stronger the acid, the more porous the plate. A perfect plate would be one in which the porosity is the greatest on the surface and gradually decreases toward the center. This would give maximum capacity and life for a given thickness of material. This desirable result can be obtained by the modification shown in Fig. 2.

Referring to Fig. 2, in addition to the elements of the device described in Fig. 1 which in Fig. 2 are designated by reference characters 2', 3', 4', 5', 6', 8' and 11', the sprayer 1' contains an additional annular chamber 12 communicating through holes 13 with chamber 4' and connected by pipe 14 to a supply of pure water (not shown) under low pressure. A table 15 is grooved to receive the grid 11 in such a way as to leave only the upper half open for pasting. After placing the grid in position as shown the operator will adjust valve 16 to give minimum acid strength and as soon as a layer has been sprayed in the grid the valve will be opened wider to give a stronger acid solution for the next layer. In this way the acid strength is continually increased until maximum strength is obtained in the top and last layer of paste. The plate is then turned over on a flat surface and the unpasted side built up in a similar manner.

Instead of varying the flow of the acid solution, it will be apparent that the water flow may be varied to secure gradually increasing acid strength. A combination of these two control schemes can be had by decreasing the water flow whenever the acid flow is increased.

It will be apparent that by following the process described the oxid and sulfuric acid are blown into the desired place before any reaction can take place and therefore the initial reaction between the two materials is taken advantage of and the binding action is therefore very efficient. Plates made in this way will retain their paste much better than when pasted by prior processes, but this is not the only advantage of this process. The paste will be automatically mixed in correct proportion and as soon as the operator stops pasting the plates, the oxid stream and acid jet will be shut off by valves (not shown) and therefore no surplus paste is left on hand. Also in pasting the grids by the new process, voids or air bubbles will be avoided as the spray will fill the interstices of the grid evenly with the oxid mixture.

Ammonium sulfate is sometimes made up into a paste with red lead and water, relying on the chemical action between the salt and the oxid to produce lead sulfate for the binder. In case that such a paste is to be employed, the red lead would be forced through the tube 8 as before explained, and a solution of ammonium sulfate in water would take the place of the sulfuric acid. Other materials can be used without departing from the spirit of the invention.

Having described my invention, what I claim is:

1. The process of filling storage battery plates, which consists in joining a stream of air containing an active material, with a stream of another active material in solution, and at substantially the same time forcing them onto the plate whereby the initial set is not disturbed.

2. The process of pasting storage battery plates which consists in atomizing a solution containing one of the reacting materials by means of a stream of air containing another of the materials and spraying the mixture onto the plates.

3. The process of pasting battery grids, which consists in atomizing a sulfuric acid solution by means of a stream of air containing a lead oxid, spraying a layer of the mixture into the central portion of the grid and gradually increasing the strength of the acid solution, as succeeding layers are sprayed, whereby the acid strength gradually increases from the inside toward the outside of the grid.

4. The process of pasting battery grids which consists in blocking up the lower half, atomizing a sulfuric acid solution by means of a stream of air containing a lead oxid, spraying a layer of the mixture into the unblocked portion, gradually increasing the strength of the acid solution as succeeding layers are sprayed, then turning the plate over and spraying the mixture into the unpasted part in the same manner, whereby the acid strength gradually increases from the inside toward each outer surface.

5. A storage battery plate comprising a framework and a porous active material applied to the framework, the porosity of said active material gradually decreasing toward the center of the plate.

In testimony whereof, I hereunto affix my signature:

THOMAS SPENCER.